United States Patent Office 3,436,378
Patented Apr. 1, 1969

3,436,378
NOVEL INTERPOLYMERS USEFUL AS THICKENING AGENTS
Julian Louis Azorlosa, Dover, Del., and Earl Pierce Williams, Pen Argyl, and Nathan D. Field, Allentown, Pa., assignors to GAF Corporation, a corporation of Delaware
No Drawing. Filed June 14, 1966, Ser. No. 557,361
Int. Cl. C08f 15/40, 15/14
U.S. Cl. 260—78.5    11 Claims

ABSTRACT OF THE DISCLOSURE

Anhydride interpolymers consisting essentially of the structural units:

Unit I $$\left[\begin{array}{c}\text{CH--CH}_2\text{--CH---CH---}\\ | \quad\quad\quad | \quad\quad | \\ \text{O} \quad\quad \text{O=C} \quad \text{C=O} \\ | \quad\quad\quad \diagdown \diagup \\ \text{R}_2 \quad\quad\quad \text{O}\end{array}\right]$$

and

Unit II $$\left[\begin{array}{c}\text{Y}\\ |\\ \text{C--CH}_2\text{--CH---CH---}\\ | \quad\quad\quad | \quad\quad | \\ \text{X} \quad\quad \text{O=C} \quad \text{C=O} \\ | \quad\quad\quad \diagdown \diagup \\ \text{R}_1 \quad\quad\quad \text{O}\end{array}\right]$$

obtained by interpolymerizing maleic anhydride with two different vinyl monomers, one of which is a vinyl ether of the structural formula:

$$R_2\text{---O---CH=CH}_2$$

and the other of which is a vinyl monomer of the structural formula:

$$R_1X\text{---}\underset{|}{\overset{Y}{C}}\text{=CH}_2$$

$R_1$=Organic radical of $C_6$ to $C_{36}$ carbon atoms.
Y=Hydrogen, halogen, lower alkyl or phenyl.
X=O, S, carboxy, carbonamido or a chemical bond.
$R_2$=lower alkyl or $(CH_2CH_2O)_q (CH_2)_m CH_3$; $q=1$ to 3, $m=0$ to 3.

---

This invention relates to novel anhydride interpolymer compounds and their water-soluble derivatives as thickening agents.

We have now discovered a surprising new class of highly useful anhydride interpolymers that are derivatives of maleic anhydride, and vinyl ethers and vinyl monomers which may be used as thickening agents, especially in the form of their water-soluble derivatives, such as their salts, partial ester-salts, partial amide-salts and the like.

The instant novel compounds have been found to be very useful in thickening solutions of high ionic strength, including concentrated salt solutions as well as bases and acids where most conventional water-soluble polymers have little effect or are insoluble. For example, the instant interpolymers are very effective in thickening 15% diammonium phosphate solution, which is used in fire-fighting and 20% tetrapotassium pyrophosphate which is used in detergent compositions and 5% sodium bromate which is used in permanent wave formulations. Moreover, the instant interpolymers are very effective for thickening concentrated ammonia as well as for thickening other strong alkali solutions such as sodium hydroxide. sodium carbonate, trisodium phosphate and sodium silicate. The thickened ammonia solutions are useful as agricultural fertilizers and the thickened strongly alkaline solutions are useful as heavy duty cleaners, paint removers, oven cleaners, etc. Moreover, the instant compounds may be used to thicken water and rubber latices as well as nonaqueous solutions or mixtures of nonaqueous and aqueous solutions such as glycerine, ethylene glycol, alcohols, methyl ethyl ketone, acetone, dimethyl formamide, dioxane as well as water solutions of the above. The instant compounds are also useful as gelling agents in cosmetic formulations such as shampoos, hand lotions, shaving creams, etc. The above solutions and dispersions have good stability upon storage, in fact some of them have even exhibited increased viscosity values upon storage.

The primary object of this invention is to provide novel anhydride interpolymer compounds and their water soluble derivatives comprising substantially equimolar quantities of maleic anhydride and vinyl monomers of two different classes. One class of vinyl monomer may be represented by the structural formula $$R_1\text{---X---}\underset{|}{\overset{Y}{C}}\text{=CH}_2$$

wherein $R_1$ represents an organic radical containing $C_6$ to $C_{36}$ carbon atoms, Y represents hydrogen, halogen (chloro, bromo), lower alkyl or phenyl and X represents oxygen, sulfur, carboxy, carbonamido or a chemical bond. The other class of vinyl monomer is a vinyl ether which may be represented by the structural formula $$R_2\text{---O---CH=CH}_2$$

wherein $R_2$ represents a radical selected from the group consisting of lower alkyl, such as methyl, ethyl, etc., and $\text{+CH}_2\text{CH}_2\text{O})_q(\text{CH}_2)_m\text{CH}_3$, wherein $q$ is an integer from 1 to 3 inclusive, and $m$ is an integer from 0 to 3 inclusive.

More specifically, the novel interpolymer compounds coming within the purview of this invention are those polymers having the following structural units:

Unit I $$\left[\begin{array}{c}\text{CH--CH}_2\text{--CH---CH---}\\ | \quad\quad\quad | \quad\quad | \\ \text{O} \quad\quad \text{O=C} \quad \text{C=O} \\ | \quad\quad\quad \diagdown \diagup \\ \text{R}_2 \quad\quad\quad \text{O}\end{array}\right]$$

and

Unit II $$\left[\begin{array}{c}\text{Y}\\ |\\ \text{C--CH}_2\text{--CH---CH---}\\ | \quad\quad\quad | \quad\quad | \\ \text{X} \quad\quad \text{O=C} \quad \text{C=O} \\ | \quad\quad\quad \diagdown \diagup \\ \text{R}_1 \quad\quad\quad \text{O}\end{array}\right]$$

wherein structural Unit I represents about 75–99.5 mole-percent (preferably about 85–99 mole-percent) and structural Unit II represents about 25 to 0.5 mole-percent (preferably about 1 to 15 mole-percent) of the interpolymer; wherein Y represents a radical selected from the group consisting of hydrogen, halogen (chloro, bromo, etc.), lower alkyl and phenyl; wherein X represents a radical selected from the group consisting of oxygen, sulfur, carboxy, carbonamido and a simple chemical bond, wherein $R_1$ represents the same or different hydrocarbon radical containing $C_6$ to $C_{36}$ carbon atoms (preferably $C_6$ to $C_{20}$) selected from the group consisting of normal chain alkyl, branched chain alkyl, cycloalkyl and alkylaryl radicals (preferably alkyl); and wherein $R_2$ represents the same or different hydrocarbon radical selected from the group consisting of methyl, ethyl, and $$\text{---(CH}_2\text{---CH}_2\text{---O)}_q\text{+CH}_2\text{)}_m\text{---CH}_3$$

radicals, (preferably methyl), where $q$ represents an integer from 1–3, and $m$ represents an integer from 0 to 3 and the water soluble derivatives of said interpolymer compounds such as their salts, partial ester-salts, partial amide-salts and the like.

The molecular weight of instant anhydride interpolymers of this invention may conveniently be defined by their specific viscosity. For example, the instant polymers encompassed by this invention are those polymers in which 1.00 g. of the polymer per 100 ml. of methyl ethyl ketone solution give a specific viscosity at 30° C. in the range of from 0.1–25, while those polymers giving a viscosity range of 0.2–20 are preferred.

These novel compounds may be prepared by conventional known methods, for example, by interpolymerizing maleic anhydride and a mixture of vinyl monomers using approximately one mole of maleic anhydride per mole of vinyl monomer mixture. A small molar excess of the vinyl monomer mixture (5 to 10%) above that of the maleic anhydride may be advantageous for insuring complete conversion of the maleic anhydride. The ratio of the $R_2$—O—CH=CH$_2$ vinyl monomer to the

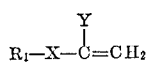

vinyl monomer comprising the total amount of such vinyl monomer mixtures should fall within the ranges set forth above, i.e., from about 75 to 99.5 mole-percent of the $R_2$—O—CH=CH$_2$ vinyl ether monomer and from about 0.5 to 25 mole-percent of the

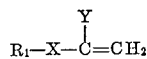

vinyl monomer. The polymerization is carried out conveniently by preparing a solvent solution of the monomers and adding a catalytic amount (preferably from 0.01 to 1.0%), of an organic free-radical-generating initiator. Then the resulting solution is mixed thoroughly and heated sufficiently so that the polymerization reaction takes place. At the completion of the polymerization reaction the precipitated interpolymer is isolated by any suitable means, such as by filtration, washed with fresh solvent and vacuum dried. Moreover, the polymerization may also be conducted by adding a solution of the vinyl monomers to a solution of initiator, maleic anhydride and solvent.

The amount of solvent is not critical and such solvents as benzene, toluene, xylene, acetone, methyl ethyl ketone, and methylene chloride, and the like may be used. However, benzene is considered the most suitable from the standpoint of product isolation and obtaining high molecular weights.

Among the organic free-radical-generating initiators that may be mentoned are azobisisobutyronitrile, benzoyl peroxide, lauroyl peroxide, caprylyl peroxide, acetyl peroxide, acetyl benzoyl peroxide, di-tert-butyl peroxide or dimethyl azoisobutyrate and the like. Mixtures of such catalysts are also suitable in the process of making the interpolymers of the invention. Radiation polymerization can be used, too, e.g., such high energy radiation sources as ultra violet light, X-rays, γ-rays, neutrons and the like can be used to initiate polymerization.

The polymerization may be carried out at a temperature within the range of 0 to 150°, preferred temperatures lie for the most part in the range from 40 to 100° C., particularly about 60–80° C.

Among the vinyl ether monomers represented by $R_2$—O—CH=CH$_2$, above, suitable for use in this invention are methyl vinyl ether, ethyl vinyl ether, methoxyethyl vinyl ether, methoxyethoxyethyl vinyl ether and the mono methyl ether of triethylene glycol vinyl ether or mixtures thereof.

Examples of the various vinyl monomers represented by

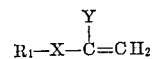

above, that may be mentioned are:

hexyl vinyl ether
heptyl vinyl ether
octyl vinyl ether
nonyl vinyl ether
decyl vinyl ether
hendecyl vinyl ether
dodecyl vinyl ether
tetradecyl vinyl ether
hexadecyl vinyl ether
octadecyl vinyl ether
myricyl vinyl ether
docosyl vinyl ether
cetyl vinyl ether 2-ethyl-1-butyl vinyl ether
2,6-dimethyl-4-heptyl vinyl ether
2,4,6,8-tetramethyl-1-nonyl vinyl ether
2-methyl-1-decyl vinyl ether
2,5-diethyl-3,7-dimethyl-1-octyl vinyl ether
isooctyl vinyl ether
2-ethyl-1-decyl vinyl ether
isodecyl vinyl ether
tridecyl vinyl ether cyclohexyl vinyl ether
decahydronaphthyl vinyl ether
hydroabietinyl vinyl ether
terpinyl vinyl ether benzyl vinyl ether
β-phenylethyl vinyl ether
hydrocinnamyl vinyl ether undecyl acrylate
lauryl acrylate
tridecyl acrylate
cetyl acrylate
octadecyl acrylate
myricyl acrylate
decyl methacrylate
dodecyl methacrylate
cetyl methacrylate
octadecyl methacrylate decyl α-ethylacrylate
dodecyl α-ethylacrylate
tetradecyl α-ethylacrylate
hexadecyl α-ethylacrylate dodecyl α-chloroacrylate
tetradecyl α-chloroacrylate
octadecyl α-chloroacrylate
octadecyl α-bromoacrylate hexyl α-phenylacrylate
octyl α-phenylacrylate
nonyl α-phenylacrylate
decyl α-phenylacrylate
dodecyl α-phenylacrylate decene-1
dodecene-1
hexadecene-1
octadecene-1
eicosene-1 vinyl laurate
vinyl palmitate
vinyl oleate
vinyl stearate

N-hexyl acrylamide
N-cetyl acrylamide
N-octadecyl acrylamide
N,N-dioactadecyl acrylamide
N-decyl methacrylamide
N,N-dioctyl methacrylamide vinyl hexyl sulfide
vinyl dodecyl sulfide
vinyl tetradecyl sulfide
vinyl hexadecyl sulfide
vinyl octadecyl sulfide N-vinyl lauramide
N-vinyl myristamide
N-vinyl palmitamide
N-vinyl stearamide
N-vinyl oleamide.

tetradecyl isopropenyl ether
hexadecyl isopropenyl ether
octadecyl isopropenyl ether
myricyl isopropenyl ether and the like, as well as mixtures thereof. The preferred vinyl monomers are those where the $R_1$ radical represents a substantially linear (long chain) moiety.

The aforesaid water-soluble derivatives of the novel anhydride interpolymers of this invention, which have been converted by hydrolysis, neutralization, esterification, etc., to compounds have the following structural units:

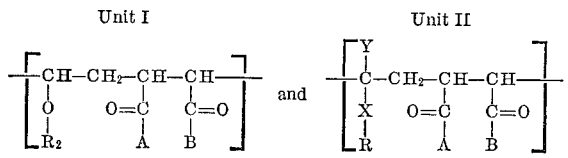

wherein $R_1$ and $R_2$, X and Y and the mole percentages of Unit I and Unit II have the same meanings as described above and wherein A and B each independently represent a member selected from the group consisting of —OH, —OM, —$NH_2$

alkoxy, and aryloxy, where $Z_1$ and $Z_2$ are selected from the group consisting of hydrogen, alkyl, aryl or together form a ring, and wherein M represents a salt forming cation selected from the group consisting of alkali metals, ammonium and substituted ammonium, such as K, Na, $NH_4$, methylammonium, diethanolammonium, piperidinium, morpholinium, triethanolammonium and the like.

The above water-soluble interpolymers include those ammoniated products involving partial as well as complete conversion of the anhydride moiety such as those compounds containing the ammonium salt-half amide moiety which may be depicted as:

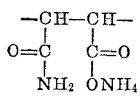

These water-soluble interpolymers may be easily derived from the above described anhydride interpolymers by forming derivatives of the anhydride portion of the polymer, by known hydrolyzing reaction thereof with water, and/or reactions involving primary and secondary alcohols, primary and secondary amines or alkali basic media to form salts, partial ester-salts, or partial amide-salts and the like.

Among the more preferred reactants that may be mentioned are water, ammonia, alkali solutions, such as sodium hydroxide, potassium hydroxide or ammonium hydroxide, etc.; methylamine, piperidine, morpholine, diethanolamine, triethanolamine, etc.; alcohols, such as methanol, ethanol, propanol, and the like; phenols, naphthols, etc.

Another object of this invention is to provide novel interpolymers particularly useful in thickened aqueous systems, i.e., in a composition of matter comprising an aqueous system having therein a thickening amount of the water soluble derivatives of the instant anhydride interpolymers, defined above. Such systems include, for example, water itself, aqueous-alkaline mixtures, aqueous-alcohol mixtures, aqueous-acid systems, polymer latices, and the like. Examples of the aqueous ionic salt acid or alkali systems which can be thickened in accordance with present invention include solutions of diammonium phosphate, tetrapotassium pyrophosphate, ammonium hydroxide, sodium hydroxide, sodium bromate, hydrochloric acid, and the like.

The amount of water present in the above mentioned aqueous systems is in no way critical, as the thickeners employed can be utilized to thicken compositions wherein water is present in only a minor amount to an aqueous system, per se. The amount of water present in the aqueous system, therefore, is merely dependent on the use for which the thickened system is intended. In general, however, it is preferred to utilize about 1 to 60% aqueous ionic solution.

Furthermore, the amount of thickener to be employed in the aqueous compositions will vary according to the desired result, the system employed, and as a practical matter, the general economic considerations. In general, however, a range of from about 0.1% to about 15% by weight of the total aqueous composition is employed, although greater or lesser amounts can be advantageously employed when desired.

The use of the instant thickeners in the above aqueous systems is indeed unique. For example, in many ionic solutions using standard thickeners the viscosity decreases as the ionic content increases. Hence, it was unexpected that the viscosity increased with ionic content when using the novel subject thickeners.

The following examples are illustrative of the present invention and are not to be regarded as limitative. It is to be understood that all parts, percentages and proportions referred to herein and in the appended claims are by weight unless otherwise indicated. The viscosities listed in the following examples were obtained with a Brookfield rotation viscometer and the value expressed in centipoises.

EXAMPLE I

The following solution was prepared:
49.0 g. (0.50 mole) of maleic anhydride were dissolved in 350 ml. benzene and filtered into a 500 ml. volumetric flask to remove maleic acid. Then 6.93 g. (0.025 mole) of a vinyl ether of Alfol 1618c (a mixture of approximately ⅓ n-octadecanol and ⅔ n-hexadecanol) and 0.049 g. azobisisobutyronitrile were added. The flask was cooled to 0° C. and 27.6 g. (0.475 mole) of distilled methyl vinyl ether were added to it.

The volume was increased to 500 ml. with benzene at 0° C., mixed well, and stored at 0° to 5° C. and labeled Solution M-5.

A control solution was similarly prepared using 49.0 g. maleic anhydride, 0.049 g. azobisisobutyronitrile and 29.0 g. methyl vinyl ether increased to 500 ml. with benzene and labeled Solution M.

Several Pyrex polymerization tubes were charged as follows, holding the solutions at 0° C.:

| Tube Solution M: | Ml. |
|---|---|
| Control | 150 |
| A | 90 |
| B | 60 |
| C | 30 |
| D | 0 |
| Tube Solution M-5: | |
| Control | 0 |
| A | 60 |
| B | 90 |
| C | 120 |
| D | 150 |

The tubes were cooled to −75° C., evacuated to 20 mm. and repressured with $N_2$. After repeating this procedure two more times and reevacuating to 20 mm., the tubes were shaken and placed in a 65° C. constant temperature and interpolymers precipitated as a thick mush. The contents of each tube were slurried with 100 ml. of benzene, filtered and washed three times with benzene. After drying in a 45° C. vacuum oven to constant weight, the specific viscosities (1.00 g. per 100 ml. of methyl ethyl ketone solution) were determined at 30° C. The yields based on isolated product amounted to 87 to 94%.

A one gram sample of each polymer was added to 99 grams of distilled water and allowed to stand at room temperature. The Brookfield viscosities of the sodium salts of the above prepared interpolymers were determined after adjusting the pH to 8.2 with sodium hydroxide.

The results of the above determinations were as follows:

| Run No. | $\eta_{sp.}$ specific viscosity | Brookfield visc. 1% solution sodium salts (cps.) | | |
|---|---|---|---|---|
| | | pH 8.2 | 25° C. | 10 r.p.m. |
| Control | 2.18 | | 70 | |
| A | 3.92 | | 120 | |
| B | 2.86 | | | |
| C | 6.18 | | 200 | |
| D | 5.32 | | 160 | |

Other interpolymers may be prepared with similar results by employing other vinyl monomers, such as octadecylmethacrylate, hexadecene-1, vinyl stearate, cetylacrylamide, vinyl dodecyl sulfide, lauryl α-phenylacrylate, N-vinyl myristamide, stearyl α-chloroacrylate, and the like, in place of the vinyl ether of Alfol 1618c used above, as well as, by employing methoxyethyl vinyl ether or methoxyethoxyethyl vinyl ether or the vinyl ether of the mono methyl ether of triethylene glycol in place of the methyl vinyl ether used above.

EXAMPLE II

Preparation of ammonium salt-half amides of above interpolymers in Example I, was as follows:

A 5.00 g. portion of a given polymer from Example I plus 100 ml. of benzene were placed in a 250 ml. reaction flask equipped with stirrer, gas inlet tube, and reflux condenser. The polymer-benzene slurry was stirred as $NH_3$ gas was introduced slowly over a one hour period. No external cooling was used; the internal temperature rose from 21° C. to a maximum of 32° C. The resulting slurry was filtered and the ammonium salt-half amide dried in a 45° C. vacuum oven for six days.

The results were as follows:

| Tube | Yield, g. | Percent N (Kjeldahl) | Brookfield visc. 0.5% solution (cps.) | | |
|---|---|---|---|---|---|
| | | | pH 7.3 | 25° C. | 10 r.p.m. |
| Control | 5.63 | 11.6 | | 100 | |
| A | 5.40 | 10.8 | | 240 | |
| B | 5.77 | 11.3 | | 300 | |
| C | 5.75 | 11.2 | | 440 | |
| D | 5.63 | 11.0 | | 860 | |

EXAMPLE III

An interpolymer ammonium salt-half amide of 50 mole-percent maleic anhydride; 47.5 mole-percent of methyl vinyl ether and 2.5 mole-percent of N-decyl vinyl ether was prepared according to the procedures described in Examples I and II above and labeled Interpolymer 1. A solution of:

| | G. |
|---|---|
| Diammonium phosphate | 15.0 |
| Interpolymer 1 | 2.5 |
| Distilled water | 84.0 | was prepared, stirred well and left standing for 18 hours. This polymer solution exhibited a Brookfield viscosity of 14,400 cps. at 25° C. using a No. 6 spindle and 10 r.p.m. The control solution (ammonium salt-half amide of PVM/MA) showed a Brookfield viscosity of 100 cps. The designation "PVM/MA," as used in this example and in the following examples, is the commonly abbreviated form for methyl vinyl ether-maleic anhydride copolymer.

EXAMPLE IV

The interpolymer ammonium salt-half amide of 50 mole-percent maleic anhydride, 49 mole-percent of methyl vinyl ether and 1 mole-percent of a mixture comprising about 61% hexadecyl vinyl ether, 34% octadecyl vinyl ether and 5% tetradecyl vinyl ether was prepared according to the procedures described in Examples I and II above and labeled Interpolymer 2. A solution of:

| | G. |
|---|---|
| Diammonium phosphate | 34.5 |
| Interpolymer 2 | 2.3 |
| Distilled water | 192.4 | was prepared. 0.8 g. of nonylphenol condensed with about 5 moles of ethylene oxide were added and the resultant mixture stirred well and left standing for 18 hours. This polymer solution exhibited a Brookfield viscosity of 4,700 cps. at 250° C. using a No. 4 spindle and 10 r.p.m., which after 30 days increased to 7,700 cps. at 25° C. using a No. 4 spindle and 10 r.p.m. The control solution PVM/MA showed a Brookfield viscosity of less than 100 cps.

EXAMPLE V

An interpolymer of 50 mole-percent maleic anhydride, 47.5 mole-percent of methyl vinyl ether, 2.5 mole-percent of a mixture comprising about 34% octadecyl vinyl ether, 61% of hexadecyl vinyl ether and 5% of tetradecyl vinyl ether was prepared according to the procedure of Example I described above and labeled Interpolymer 3. A solution of:

| | G. |
|---|---|
| Interpolymer 3 | 1.00 |
| Distilled water | 93.0 |
| NaOH solution, 50% (wt.) | 1.0 |
| $NaBrO_3$ | 5.00 | was prepared. This polymer solution exhibited a Brookfield viscosity of 8,400 cps. at 25° C. using a No. 7 spindle and 10 r.p.m., which after nine days had increased to 12,000 cps. at 25° C. using a No. 5 spindle and 10 r.p.m. The control solution PVM/MA showed a Brookfield viscosity of 40 cps.

EXAMPLE VI

The interpolymer of 50 mole-percent maleic anhydride, 49 mole-percent of methyl vinyl ether and 1 mole-percent of a mixture comprising about 33% octadecyl vinyl ether and 67% hexadecyl vinyl ether was prepared according to the procedure described above in Example I and labeled Interpolymer 4. One gram of Interpolymer 4 in 100 ml. of methyl ethyl ketone exhibited a specific viscosity of 3.65 at 30° C. A solution of:

| | G. |
|---|---|
| Interpolymer 4 | 4.0 |
| Anhydrous tetrapotassium pyrophosphate | 80.0 |
| Water | 316.0 | was prepared and mixed with high speed stirring. Said solution exhibited a Brookfield viscosity of 24,000 cps. at 25° C. using a No. 7 spindle and 10 r.p.m. The control solution of PVM/MA showed a Brookfield viscosity of 33 cps.

EXAMPLE VII

An interpolymer of 50 mole-percent maleic anhydride, 45 mole-percent of methyl vinyl ether and 5 mole-percent of a mixture comprising about 33% octadecyl vinyl ether and 67% hexadecyl vinyl ether was prepared according to Example I and labeled Interpolymer 5. One gram of Interpolymer 5 in 100 ml. of methyl ethyl ketone exhibited a specific viscosity of 9.35 at 30° C. A solution of:

| | G. |
|---|---|
| Interpolymer 5 | 0.75 |
| $NH_3$, 28% | 53.6 |
| Water | 45.7 | was prepared and mixed well with high speed stirring. Said solution exhibited a Brookfield viscosity of 36,400 cps. at 25° C. using a No. 7 spindle and 10 r.p.m. The control solution of PVM/MA showed a Brookfield viscosity of less than 450 cps.

EXAMPLE VIII

A solution of:

| | G. |
|---|---|
| Interpolymer 4 (Example VI, above) | 3.0 |
| NaOH, 50% by weight | 30.0 |
| Water | 67.0 | was prepared and mixed well with high speed stirring. Said solution exhibited a Brookfield viscosity of 63,200 cps. at 25° C. using a No. 7 spindle and 10 r.p.m. The control solution of PVM/MA showed a Brookfield viscosity of 90 cps.

EXAMPLE IX

A solution of:
80.0 g. of a 1.25% aqueous solution of Interpolymer 4 (Example VI, above) in which the pH has been adjusted to 6.9;
5.0 g. water;
15.9 g. NaCl was prepared and mixed well with high speed stirring. Said solution exhibited a Brookfeld viscosity of 6,000 cps. at 25° C. using a No. 6 spindle and 10 r.p.m. The control solution of PVM/MA showed a Brookfield viscosity of less than 100 cps.

EXAMPLE X

A solution of:

| | G. |
|---|---|
| Interpolymer 4 (Example VI above) | 1.0 |
| NaOH, 50% by weight | 0.6 |
| Water | 83.4 |
| $Na_2SiO_3 \cdot 9H_2O$ | 15.0 | was prepared and mixed well with high speed stirring. Said solution exhibited a Brookfield viscosity of 1,040 cps. at 25° C. using a No. 5 spindle and 10 r.p.m. The control solution of PVM/MA showed a Brookfield viscosity of less than 50 cps.

EXAMPLE XI

Example X was repeated using 15.0 g. of $NH_4Cl$ in place of the $Na_2SiO_3 \cdot 9H_2O$. This solution exhibited a Brookfield viscosity of 10,000 cps. at 25° C. using a No. 6 spindle and 10 r.p.m. The control solution of PVM/MA showed a Brookfield viscosity of less than 100 cps.

EXAMPLE XII

Example X was repeated using 15.0 g. $Na_2CO_3$ in place of the $Na_2SiO_3 \cdot 9H_2O$. This solution exhibited a Brookfield viscosity of 18,000 cps. at 25° C. using a No. 7 spindle and 10 r.p.m. The control solution of PVM/MA showed a Brookfield viscosity of less than 100 cps.

EXAMPLE XIII

A solution of:

| | G. |
|---|---|
| Interpolymer 4 (Example VI, above) | 1.0 |
| Water | 83.1 |
| $Na_2SO_4$ | 15.0 | was prepared; 0.9 g. 28% $NH_3$ were added and the resultant product mixed well with high speed stirring. Said solution exhibited a Brookfield viscosity of 6,800 cps. at 25° C. using a No. 6 spindle and 10 r.p.m. The control solution of PVM/MA showed a Brookfield viscosity of less than 50 cps.

EXAMPLE XIV

Example XIII was repeated using 15.0 g. of sodium acetate in place of the $Na_2SO_4$. This solution exhibited a Brookfield viscosity of 3,700 cps. at 25° C. using a No. 6 spindle and 10 r.p.m. The control solution of PVM/MA showed a Brookfield viscosity of less than 50 cps.

EXAMPLE XV

Example XIII was repeated using 15.0 g.

$Na_3PO_4 \cdot 12H_2O$ in place of $Na_2SO_4$. This solution exhibited a Brookfield viscosity of 43,600 cps. at 25° C. using a No. 7 spindle and 10 r.p.m. The control solution of PVM/MA showed a Brookfield viscosity of less than 450 cps.

EXAMPLE XVI

A double strength synthetic sea water solution was prepared using:

| | G. |
|---|---|
| $MgCl_2 \cdot 6H_2O$ | 26.4 |
| $CaCl_2 \cdot 2H_2O$ | 3.84 |
| $Na_2SO_4$ | 9.6 |
| NaCl | 60.0 | and made up to a total of 1.2 liters with the addition of water.

A solution of:

50.0 g. above double strength synthetic sea water
50.0 g. of a 2.0% aqueous solution of sodium salt of Interpolymer 4 was prepared. This solution exhibited a Brookfield viscosity of 10,400 cps. at 25° C. using a No. 7 spindle and 10 r.p.m. The control solution of PVM/MA showed a Brookfield viscosity of less than 200 cps.

EXAMPLE XVII

The procedure in Example I was repeated except that 0.05 mole of n-octyl vinyl ether were substituted for 0.025 mole of the vinyl ether of Alfol 1618c and 0.45 mole of methyl vinyl ether were used instead of 0.475 mole. Thus the prepared interpolymer contained a mole ratio of 9 moles of methyl vinyl ether to 1 mole of n-octyl vinyl ether. This interploymer, at 2% concentration in 25% aqueous sodium hydroxide produced a substantially thicker solution than the one formed from a control solution having no long chain vinyl ether in the copolymer.

EXAMPLE XVIII

The procedure in Example I was repeated except that 0.025 mole of n-hexadecyl vinyl ether were substituted for 0.025 mole of the vinyl ether of Alfol 1618c. Thus the prepared interpolymer contained a mole ratio of 9.5 moles of methyl vinyl ether to 0.5 mole of n-hexadecyl vinyl ether. This interpolymer at 1% concentration in a 15% diammonium phosphate solution produced a substantially thicker solution than one formed from a control solution having no long chain vinyl ether in the copolymer.

EXAMPLE XIX

The procedure in Example I was repeated except that 0.005 mole of a mixture comprising about 55% dodecyl vinyl ether and about 45% tetradecyl vinyl ether was substituted for the vinyl ether of Alfol 1618c and 0.495 mole of methyl vinyl ether were used instead of 0.475 mole. Thus the prepared interpolymer contained a mole ratio of 9.9 moles of methyl vinyl ether to 0.1 mole of the above vinyl ether mixture.

A solution of:

2.0 g. of the above prepared interpolymer converted to the ammonium amide according to Example II
20.0 g. tetrapotassium pyrophosphate
78.0 g. water was prepared and mixed well with high speed stirring. Said solution exhibited a Brookfield viscosity of 1,600 cps. at 25° C. using a No. 5 spindle and 10 r.p.m. The control solution PVM/MA showed a Brookfield viscosity of 200 cps.

EXAMPLE XX

The procedure according to Example I was repeated except that 0.035 mole of a mixture comprising about 46% octyl vinyl ether and 54% decyl vinyl ether was substituted for the vinyl ether of Alfol 1618c and 0.465 mole of methyl vinyl ether were used instead of 0.475 mole. Thus the prepared interpolymer contained a mole ratio of 9.3 moles of methyl vinyl ether to 0.7 mole of the above vinyl ether mixture.

A solution of:

2.0 g. of the above prepared interpolymer converted to the ammonium amide according to Example II
20.0 g. tetrapotassium pyrophosphate
78.0 g. water was prepared and mixed well with high speed stirring. Said solution exhibited a Brookfield viscosity of 6,800 cps. at 25° C. using a No. 5 spindle and 10 r.p.m. The control solution PVM/MA showed a Brookfield viscosity of 200 cps.

EXAMPLE XXI

The procedure in Example I was repeated except that 0.025 mole of a mixture comprising 43% hexadecene-1, 33% octadecene-1, and 24% eicosene-1 was substituted for the 0.025 mole of the vinyl ether of Alfol 1618c. A series of interpolymers was prepared containing varying mole ratios of methyl vinyl ether to the above α olefin mixture. The interpolymers contained mole ratios of methyl vinyl ether to the above α olefin mixture in the order of (A) 9.8 to 0.2, (B) 9.7 to 0.3, (C) 9.6 to 0.4 and (D) 9.5 to 0.5. The specific viscosity of these interpolymers as compared to a control solution was as follows:

|  | Specific viscosity |
|---|---|
| Control | 2.41 |
| A | 2.14 |
| B | 2.04 |
| C | 2.19 |
| D | 2.20 |

These interpolymers at 3% concentration in a 20% tetrapotassium pyrophosphate solution produced substantially thicker solutions than one formed from a control solution having no long chain vinyl monomer in the copolymer.

EXAMPLE XXII

The procedure in Example I was repeated except that 0.035 mole of a mixture comprising 67% hexadecene-1 and 33% octadecene-1 were substituted for 0.025 mole of the vinyl ether of Alfol 1618c and 0.465 mole of methyl vinyl ether were used instead of 0.475 mole. Thus an interpolymer was prepared which contained a mole ratio of 9.3 moles of methyl vinyl ether to 0.7 mole of the above α olefin vinyl mixture.

A solution of:

2.0 g. of the above prepared interpolymer
20.0 g. tetrapotassium pyrophosphate
78.0 g. water was prepared and mixed well with high speed stirring. Said solution exhibited a Brookfield viscosity of 4,400 cps. at 25° C., using a No. 7 spindle at 10 r.p.m. The control solution of PVM/MA showed a Brookfield viscosity of 200 cps.

EXAMPLE XXIII

The procedure of Example I was repeated except that 0.025 mole of octadecyl methacrylate were substituted for 0.025 mole of the vinyl ether of Alfol 1618c. A series of interpolymers was prepared containing varying mole ratios of methyl vinyl ether to octadecyl methacrylate. The interpolymers contained mole ratios of methyl vinyl ether to octadecyl methacrylate in the order of (A) 9.8 to 0.2, (B) 9.7 to 0.3, (C) 9.6 to 0.4 and (D) 9.5 to 0.5. The specific viscosity of these interpolymers as compared to a control solution was as follows:

|  | Specific viscosity |
|---|---|
| Control | 2.48 |
| A | 3.08 |
| B | 3.11 |
| C | 4.16 |
| D | 4.47 |

A solution of:

2.0 g. of the above prepared interpolymer containing a mole ratio of 9.8 moles of methyl vinyl ether to 0.2 mole of octadecyl methacrylate
15.0 g. diammonium phosphate
83.0 g. water was prepared and mixed well with high speed stirring. Said solution exhibited a Brookfield viscosity of 22,800 cps. at 25° C. using a No. 7 spindle at 10 r.p.m. The control solution PVM/MA showed a Brookfield viscosity of 120 cps.

EXAMPLE XXIV

The procedure of Example I was repeated except that 0.025 mole of dodecyl vinyl sulfide were substituted for the 0.025 mole of the vinyl ether of Alfol 1618c. A series of interpolymers was prepared containing varying mole ratios of methyl vinyl ether to dodecyl vinyl sulfide. The interpolymers contained mole ratios of methyl vinyl ether to dodecyl vinyl sulfide in the order of (A) 9.8 to 0.2, (B) 9.7 to 0.3, (C) 9.6 to 0.4 and (D) 9.5 to 0.5. The specific viscosity of these interpolymers as compared to a control solution was as follows:

|  | Specific viscosity |
|---|---|
| Control | 1.86 |
| A | 0.89 |
| B | 0.75 |
| C | 0.72 |
| D | 0.52 |

These interpolymers at 5% concentration in a 20% tetrapotassium pyrophosphate solution produced essentially thicker solutions than one formed from a control having no long chain vinyl monomer in the copolymer.

EXAMPLE XXV 376 g. of maleic anhydride and 2,822 g. of benzene were charged into a 2 gallon autoclave equipped with turbine and baffles. The autoclave was closed and purged 3 times with nitrogen, then heated to 75° C., agitated and held at 75° C. for 30 minutes. A premixed solution of 15.0 g. of lauroyl peroxide in 100.0 g. benzene was added. Following this a premixed solution of 222 g. of methyl vinyl ether and 21 g. of the vinyl ether of Alfol 1618c was added continuously over a period of 1½ hours at 75° C. The reaction slurry was held an additional hour at 75° C. and then the slurry filtered and the precipitate dried in a vacuum oven at 40 to 45° C. The specific viscosity of the precipitate (1.00 g. per 100 ml. of methyl ethyl ketone solution) at 30° C. was 0.32.

EXAMPLE XXVI

A solution of:

5.0 g. interpolymer (Example XXV, above, having a mole ratio of 9.5 moles of methyl vinyl ether to 0.5 mole of the vinyl ether of Alfol 1618c)
52.0 g. 28.9% NH₃
43.9 g. water was prepared and mixed well with high speed stirring. Said solution exhibited a Brookfield viscosity of 11,200 cps. at 25° C. using a No. 7 spindle at 10 r.p.m. The control solution of PVM/MA showed a Brookfield viscosity of 20 cps.

EXAMPLE XXVII

The procedure of Example I was repeated except that 0.475 mole of ethyl vinyl ether were substituted for 0.475 mole of methyl vinyl ether. A series of interpolymers was prepared containing varying mole ratios of ethyl vinyl ether to the vinyl ether of Alfol 1618c. These interpolymers contain mole ratios of ethyl vinyl ether to the vinyl ether of Alfol 1618c in the order of (A) 9.8 to 0.2, (B) 9.7 to 0.3, (C) 9.6 to 0.4 and (D) 9.5 to 0.5. These interpolymers at 1% concentration in 15% $NH_3$ produced substantially thicker solutions than one formed from a control solution having no long chain vinyl ether in the copolymer.

EXAMPLE XXVIII

The procedure of Example I was repeated except that 0.475 mole of methoxyethoxyethyl vinyl ether was substituted for 0.475 mole of methyl vinyl ether. A series of interpolymers was prepared containing varying mole ratios of methoxyethoxyethyl vinyl ether to the vinyl ether of Alfol 1618c. The interpolymers contained mole ratios of methoxyethoxyethyl vinyl ether to the vinyl ether of Alfol 1618c in the order of (A) 9.8 to 0.2, (B) 9.7 to 0.3, (C) 9.6 to 0.4 and (D) 9.5 to 0.5. These interpolymers at 1% concentration in 15% $NH_3$ produced substantially thicker solutions than one formed from a control solution having no long chain vinyl ether in the copolymer.

Various modifications and variations of this invention will be obvious to a worker skilled in the art and it is understood that such modifications and variations are to be included within the purview of this application and the spirit and scope of the appended claims.

We claim:

1. An anhydride interpolymer consisting essentially of the structural units

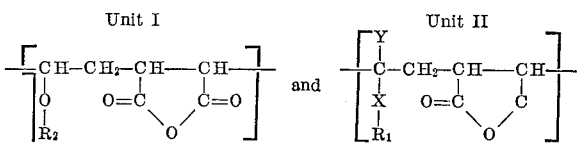

wherein Y represents a member selected from the group consisting of hydrogen, halogen, lower alkyl and phenyl radicals, wherein X represents a member selected from the group consisting of a simple chemical bond, oxygen, sulfur, carboxy, and carbonamido radicals; wherein $R_1$ represents a hydrocarbon radical having from $C_6$ to $C_{32}$ carbon atoms selected from the group consisting of alkyl, cycloalkyl and arylalkyl radicals; wherein $R_2$ represents a hydrocarbon radical selected from the group consisting of methyl, ethyl and $(CH_2CH_2O)_q(CH_2)_mCH_3$ radicals wherein $q$ is an integer from 1 to 3 inclusive and $m$ is an integer from 0 to 3 inclusive; said interpolymer having a specific viscosity, at 1% weight per volume in methyl ethyl ketone at 30° C. in the range of about 0.1 to 25; Unit I comprising about 75 to about 99.5 mole-percent of the interpolymer and Unit II comprising about 0.5 to about 25 mole-percent of the interpolymer.

2. An anhydride interpolymer, according to claim 1, wherein $R_1$ represents a hydrocarbon radical having from $C_6$ to $C_{20}$ carbon atoms.

3. An anhydride interpolymer, according to claim 1, wherein $R_2$ is a methyl radical.

4. An anhydride interpolymer, according to claim 1, wherein $R_1$ is an alkyl radical having from $C_6$ to $C_{20}$ carbon atoms.

5. A water-soluble interpolymer consisting essentially of the structural units:

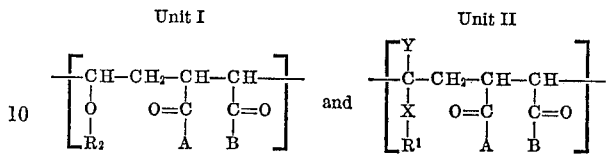

wherein Y represents a member selected from the group consisting of hydrogen, halogen, lower alkyl and phenyl radicals; wherein X represents a member selected from the group consisting of a simple chemical bond, oxygen, sulfur, carboxy and carbonamido radicals; wherein $R_1$ represents a hydrocarbon radical having from $C_6$ to $C_{32}$ carbon atoms selected from the group consisting of alkyl, cycloalkyl, and arylalkyl radicals; wherein $R_2$ represents a hydrocarbon radical selected from the group consisting of methyl, ethyl and $(CH_2CH_2O)_q(CH_2)_mCH_3$, wherein $q$ is an integer from 1 to 3 inclusive and $m$ is an integer from 0 to 3 inclusive; and wherein A and B each independently represent a radical selected from the group consisting of hydroxy, amino, alkoxy, aryloxy and —OM wherein M represents a salt forming cation; Unit I comprising about 75 to about 99.5 mole-percent of the interpolymer and Unit II comprising about 0.5 to about 25 mole-percent of the interpolymer.

6. A water-soluble interpolymer, according to claim 5, wherein $R_1$ represents a hydrocarbon radical having from $C_6$ to $C_{20}$ carbon atoms.

7. A water-soluble interpolymer, according to claim 5, wherein $R_2$ is a methyl radical.

8. A water-soluble interpolymer, according to claim 5, wherein A and B each independently represent —$NH_2$ and —$ONH_4$.

9. A water-soluble interpolymer, according to claim 5, wherein $R_1$ is an alkyl radical; wherein Y is hydrogen and wherein X is oxygen.

10. A water-soluble interpolymer, according to claim 5, wherein A and B both represent a hydroxy radical.

11. A water-soluble interpolymer, according to claim 10, wherein Y is hydrogen; wherein X is oxygen and wherein $R_1$ is a mixture of about 66 percent hexadecyl alkyl and about 33 percent octadecyl alkyl.

References Cited

UNITED STATES PATENTS

| | | | |
|---|---|---|---|
| 2,998,400 | 8/1961 | French | 260—78.5 |
| 3,017,377 | 1/1962 | Kuhn | 260—78.5 |
| 2,985,625 | 5/1961 | Jones | 260—78.5 |

JOSEPH L. SCHOFER, *Primary Examiner.*

JOHN KIGHT, *Assistant Examiner.*

U.S. Cl. X.R.

260—29.1, 29.6, 30.2, 32.6, 33.4, 78; 167—87, 91

PO-1050
(5/69)

UNITED STATES PATENT OFFICE
CERTIFICATE OF CORRECTION

Patent No. 3,436,378          Dated April 1, 1969

Inventor(s) Julian L. Azorlosa and Earl P. Williams and Nathan D. Field

It is certified that error appears in the above-identified patent and that said Letters Patent are hereby corrected as shown below:

Column 3, line 34, "mentoned" should read -- mentioned --.
Column 4, line 1, "methyl" should read -- ethyl --; line 4, "ethyl-1-decyl" should read -- ethylhexyl --; line 52, "dioactadecyl" should read -- dioctadecyl --. Column 8, line 11 "250°C." should read -- 25°C. --; line 52, after "mixed" insert -- well --. Column 12, line 66, "43.9" should read -- 43.0 --.

Signed and sealed this 12th day of December 1972.

(SEAL)
Attest:

EDWARD M. FLETCHER, JR.
Attesting Officer

ROBERT GOTTSCHALK
Commissioner of Patents